US010094742B2

(12) United States Patent
Stein et al.

(10) Patent No.: US 10,094,742 B2
(45) Date of Patent: Oct. 9, 2018

(54) WHEEL MONITORING SYSTEM

(71) Applicant: Goodrich Corporation, Charlotte, NC (US)

(72) Inventors: Eric Stein, Phoenix, AZ (US); Philip Readio, Phoenix, AZ (US); Paul L. Summers, Troy, OH (US)

(73) Assignee: Goodrich Corporation, Charlotte, NC (US)

(*) Notice: Subject to any disclaimer, the term of this patent is extended or adjusted under 35 U.S.C. 154(b) by 550 days.

(21) Appl. No.: 14/318,040

(22) Filed: Jun. 27, 2014

(65) Prior Publication Data

US 2015/0377741 A1 Dec. 31, 2015

(51) Int. Cl.
G01M 17/02 (2006.01)
H04B 5/00 (2006.01)
B60C 23/04 (2006.01)

(52) U.S. Cl.
CPC ............ *G01M 17/02* (2013.01); *B60C 23/042* (2013.01); *B60C 23/043* (2013.01); *B60C 23/0413* (2013.01); *H04B 5/0037* (2013.01)

(58) Field of Classification Search
CPC .................... B60C 23/043; B60C 23/0413
See application file for complete search history.

(56) References Cited

U.S. PATENT DOCUMENTS

| 4,467,641 A * | 8/1984 | Abraham | ............ B60C 23/0413 340/447 |
| 4,737,761 A | 4/1988 | Dosjoub et al. | |
| 5,142,281 A * | 8/1992 | Park | ....................... G01S 5/0009 340/989 |
| 5,228,337 A * | 7/1993 | Sharpe | ................ B60C 23/0408 340/445 |
| 5,790,016 A * | 8/1998 | Konchin | .............. G01D 5/2073 340/442 |
| 5,939,977 A | 8/1999 | Monson | |

(Continued)

FOREIGN PATENT DOCUMENTS

| FR | 2865589 A1 * | 7/2005 | ......... B60C 23/0413 |
| WO | 8202249 A1 | 7/1982 | |
| WO | 2009138687 A2 | 11/2009 | |

OTHER PUBLICATIONS

Finkenzeller, et.al., "Range extension of an ISO/IEC 14443 type A RFID system with active emulating load modulation," May 17-18, 2011Smart Objects: systems, technologies and applications, proceedings of RFID sysTech 2011, 7th European workshop.*

(Continued)

*Primary Examiner* — Thienvu Tran
*Assistant Examiner* — Pinping Sun
(74) *Attorney, Agent, or Firm* — Kinney & Lange, P.A.

(57) ABSTRACT

A control unit supplies power and data through a rotary transformer to a sensor assembly disposed on a wheel. The data sent by the control unit to the sensor assembly is produced by modulation of the power signal using frequency shift key or amplitude shift key modulation. The sensor assembly converts the received power signal that power to operate the circuitry and sensor assembly, converts the FSK or ASK data signal, and sends sensor data back to the control unit through the rotary transformer by load modulation. The control unit demodulates the load modulated sensor data.

10 Claims, 2 Drawing Sheets

(56) References Cited

U.S. PATENT DOCUMENTS

| | | | | |
|---|---|---|---|---|
| 6,121,692 A * | 9/2000 | Michaels | | B60R 16/027 307/10.1 |
| 6,301,306 B1 * | 10/2001 | McDonald | | H04B 1/24 375/259 |
| 6,529,127 B2 * | 3/2003 | Townsend | | G01L 1/2256 340/10.1 |
| 6,535,116 B1 * | 3/2003 | Zhou | | B60C 23/009 340/438 |
| 6,885,283 B2 | 4/2005 | O'Connor et al. | | |
| 7,205,885 B2 * | 4/2007 | Kulha | | B60C 23/043 340/442 |
| 8,791,600 B2 * | 7/2014 | Soar | | H01F 27/365 307/104 |
| 2003/0001707 A1 * | 1/2003 | Michaels | | H01F 38/18 336/182 |
| 2004/0061601 A1 * | 4/2004 | Freakes | | B60C 23/041 340/442 |
| 2006/0120006 A1 * | 6/2006 | Bennertz | | B60C 23/043 361/143 |
| 2006/0156802 A1 * | 7/2006 | Cohen | | B60C 23/041 73/146 |
| 2006/0244568 A1 * | 11/2006 | Tong | | H04Q 9/00 340/10.41 |
| 2009/0184815 A1 * | 7/2009 | Suzuki | | B60C 23/0408 340/447 |
| 2010/0161004 A1 * | 6/2010 | Najafi | | A61N 1/3787 607/60 |
| 2012/0022613 A1 * | 1/2012 | Meskens | | A61N 1/3727 607/57 |
| 2013/0154560 A1 * | 6/2013 | Walley | | H01M 2/0267 320/108 |
| 2013/0249479 A1 * | 9/2013 | Partovi | | H02J 7/025 320/108 |
| 2014/0232201 A1 * | 8/2014 | Staring | | H02J 5/005 307/104 |
| 2014/0347008 A1 * | 11/2014 | Chae | | H02J 5/005 320/108 |
| 2015/0008756 A1 * | 1/2015 | Lee | | H02J 17/00 307/104 |
| 2015/0049833 A1 * | 2/2015 | Noguchi | | H04L 25/0268 375/272 |

OTHER PUBLICATIONS

Extended European Search Report, EP Application No. 15173460.5-1760, dated Nov. 20, 2015, 6 pages.
Extended European Search Report for EP Application 15173460.5, dated Mar. 29, 2017, 4 Pages.

* cited by examiner

WHEEL MONITORING SYSTEM

BACKGROUND

Systems have been developed for measuring inflation pressure and temperature of gas in a tire on a vehicle wheel and transmitting the sensed values to an electrical system within the vehicle. Systems of this type have been used in automobiles and also in aircraft. The use of tire or wheel monitoring systems allow a control unit of an aircraft to monitor the pressure of each tire of the aircraft landing gear during taxiing, take-off, flight, and landing. The communication between the control unit on a stationary portion of the vehicle and a sensor assembly mounted on the wheel has been achieved using a rotary transformer. Power can be transmitted inductively across a wireless gap of the rotary transformer to the sensor assembly. Tuned primary and secondary tank circuits can be used to facilitate the transfer of power from the control unit to the sensor assembly, and the transmission of data from the sensor assembly back to the control unit.

SUMMARY

A communication system between a control unit and a sensor assembly provides wireless transmission of power and control unit data from the control unit to the sensor assembly, and wireless transmission of sensor data from the sensor assembly to the control unit. The control unit produces a power signal having a carrier frequency, and modulates the power signal to provide control unit data to the sensor assembly. The power signal, along with modulation representing the control unit data, is transmitted through a rotary transformer to the sensor assembly. Power is derived by the sensor assembly from the received power signal, and control unit data is demodulated from the power signal. Sensor data is generated by the sensor assembly and transmitted back to control unit through the transformer by modulation of the power signal.

DETAILED DESCRIPTION

Figure 1:
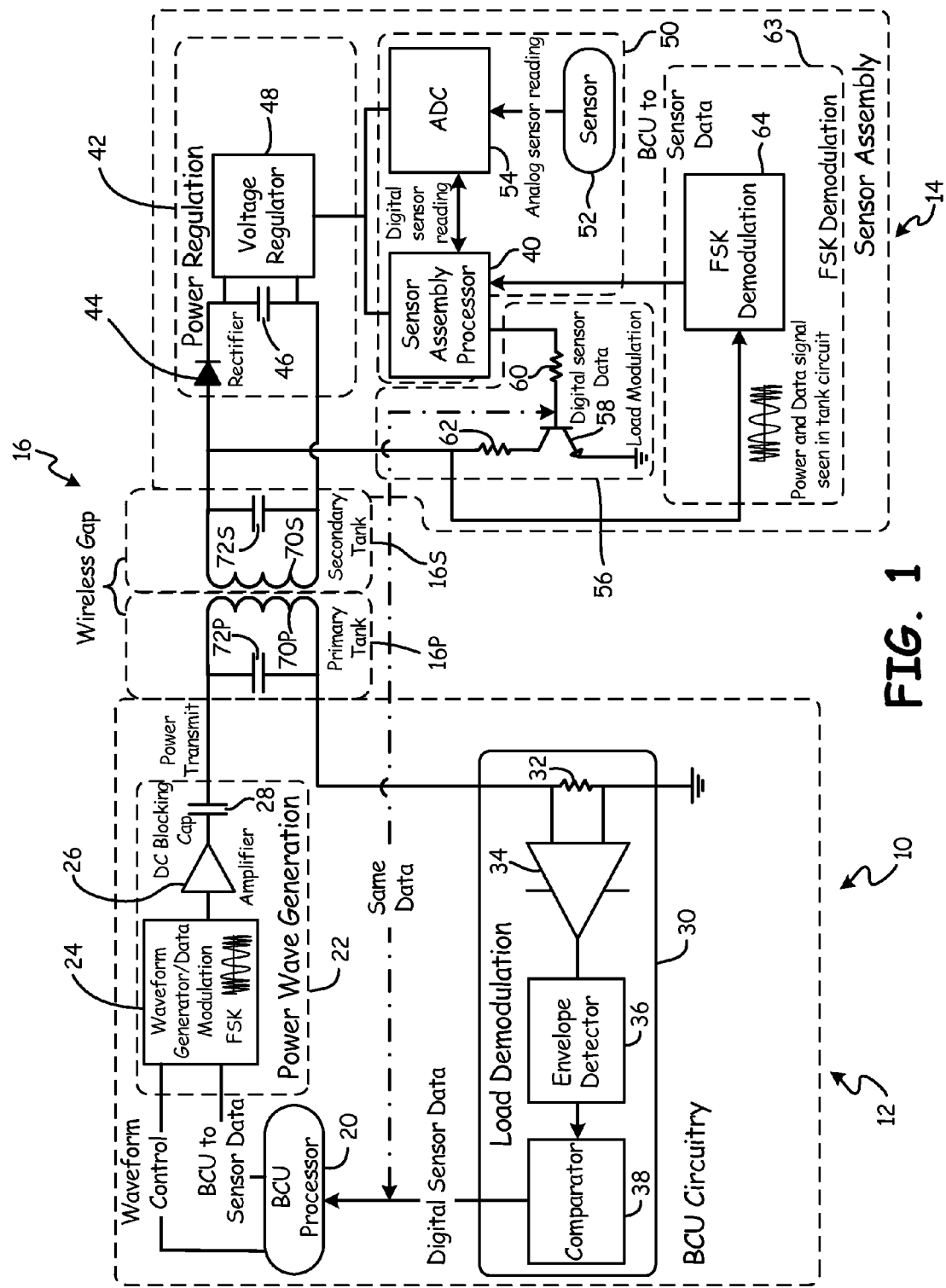
FIG. 1 is a block diagram of a tire monitoring system including a control unit, a sensor assembly, and a rotary transformer, in which both power and control unit data are sent to the sensor assembly using frequency shift key (FSK) modulation of the power signal.

FIG. 1 is a block diagram showing wheel monitory system 10, which includes brake control unit (BCU) circuitry 12, sensor assembly 14, and rotary transformer 16 (which includes primary tank circuit 16P and secondary tank circuit 16S). BCU circuitry 12 provides a power signal modulated to contain BCU-to-sensor data through rotary transformer 16 to sensor assembly 14. Sensor assembly 14 receives the power signal and BCU-to-sensor data and uses the received power signal to derive power to operate the components of sensor assembly 14. The modulated power signal is demodulated by the sensor to derive the BCU-to-sensor data. Sensor assembly 14 senses a parameter, such as tire pressure, converts the sensor reading to digital sensor data, and modulates digital sensor data to BCU circuitry 12 through rotary transformer 16 by load modulation. The digital sensor data is received by BCU circuitry 12 from rotary transformer 16 and is demodulated and provided for use by BCU circuitry 12 or for reporting to other systems of the vehicle.

BCU circuitry 12 includes BCU processor 20, which is a digital processor such as a microprocessor, microcontroller, application specific integrated circuit (ASIC), or field programmable gate array (FPGA). BCU processor 20 provides waveform control signals and BCU-to-sensor data to power wave generation circuitry 22, which includes waveform generator/data modulation circuitry 24, amplifier 26, and DC blocking capacitor 28. Based upon the waveform control signals and the BCU-to-sensor data provided by BCU processor 20, waveform generator/data modulation circuitry 24 produces an AC power signal having a carrier frequency and amplitude determined by the waveform control signal. When BCU-to-sensor data is to be sent to sensor assembly 14, waveform generator/data modulation circuitry 24 Frequency Shift Key (FSK) modulates the AC power signal. The AC power signal (with or without) FSK modulation, is amplified by amplifier 26 and provided through DC blocking capacitor 28 to primary tank circuit 16P of rotary transformer 16.

Demodulation circuitry 30 is also connected to primary tank circuit 16P. It receives a signal representing digital sensor data from sensor assembly 14. Load demodulation circuitry 30 includes sense resistor 32, operational amplifier 34, envelope detector 36, and comparator 38. The output of comparator 38 is digital sensor data, which is provided to BCU processor 20.

Sensor assembly 14 includes sensor assembly processor 40, which may be a microprocessor, microcontroller, ASIC, FPGA, or other digital processor. Power for the components of sensor 14 is derived from the power and data signal produced by BCU circuitry 12 and transmitted through primary tank circuit 16P to secondary tank circuit 16S of rotary transformer 16. Power regulation circuit 42 is connected to secondary tank circuit 16S, and includes rectifier 44, capacitor 46, and voltage regulator 48.

Sensor circuitry 50 includes sensor 52, analog-to-digital converter 54, and processor 40. Sensor 52 senses a parameter associated with the wheel to which sensor assembly 14 is mounted. That parameter may be, for example, tire pressure or temperature. The analog sensor signal (or reading) is provided to analog-to-digital converter 54, before it is converted to a digital sensor reading. Sensor assembly digital processor 40 receives the digital sensor reading, and produces digital sensor data which is converted to a load modulation signal by load modulation circuit 56, which is connected to secondary tank circuit 16S. Load modulation circuit 56 includes transistor 58 and resistor 60 and 62. As transistor 58 is turned on and off by the digital sensor data from sensor assembly processor 40, the load on secondary tank circuit 16S changes. This causes a load modulation signal to be transmitted across the wireless gap of rotary transformer 16 to primary tank circuit 16P, and then to load demodulation circuitry 30 of BCU circuitry 12.

Sensor assembly 14 also includes demodulation circuitry 63. In this embodiment, demodulation circuitry 63 includes FSK demodulator 64, which is connected to secondary tank circuit 16S to receive the power and data signal seen in tank circuit 16S. FSK demodulator 64 demodulates the data signal from the combined power and data signal and provides the BCU-to-sensor data to sensor assembly processor 40.

Wireless transformer 16 includes primary tank circuit 16P and secondary tank circuit 16S. Primary tank circuit 16P includes primary inductive winding 70P and capacitor 72P. Secondary tank circuit 16S includes secondary inductive winding 70S and capacitor 72S. The inductance and capacitance of primary and secondary tank circuits 16P and 16S are selected so that tank circuits 16P and 16S are tuned to be optimized for a specific application. Although tank circuits 16P and 16S are shown with an inductive winding and capacitor in parallel, other circuit configurations can be used.

The power signal is an AC signal at a carrier frequency Y. The carrier frequency is chosen to be an optimal frequency at which to transmit power and data across the wireless gap from primary tank circuit 16P to secondary tank circuit 16S. The acceptable range of frequencies that is sufficient to transmit power and sustain operation of sensor assembly 14, is defined by Y+X1 and Y−X2, where X1 and X2 are the acceptable frequency deviations from the carrier frequency and are determined based on the specific application. BCU circuitry 12 encodes data into the carrier wave (power signal) through frequency shift key modulation. The frequency variation limits for the FSK modulation are constrained by Y+X1 and Y−X2. The frequency changes produced by waveform generator/data modulation circuitry 24 are distinct enough for sensor assembly 14 (and in particular FSK demodulator 64) to be able to interpret the BCU-to-sensor data encoded within the power signal. On the other hand, the frequency changes are not so distinct (large) that sensor assembly 14 loses power from the loss of power transmission efficiency through rotary transformer 16.

The ability to transmit BCU-to-sensor data across transformer 16 makes it possible to communicate to the sensor from the BCU or from a special interface device, after sensor assembly 14 is sealed. It allows the ability to reprogram, characterize, upgrade, and further use sensor assembly 14. It also allows communication from BCU circuitry 12 to sensor assembly 14 to provide sensor assembly processor 40 with sensor information about the system in which it is operating. This allows sensor assembly 14 to gather important system data.

In addition, the ability to send BCU-to-sensor data from BCU circuitry 12 to sensor assembly 14 can be used in embodiments in which multiple sensors are incorporated in sensor assembly 14. The BCU-to-sensor data can be used to address a specific one of the multiple sensors, and would allow sensor assembly 14 to send back data selectively from the addressed sensors. This minimizes the amount of time that it would take to get information from the sensor assembly, because it would not be necessary to wait for all sensors to reply before data is gathered by BCU circuitry 12.

Figure 2:
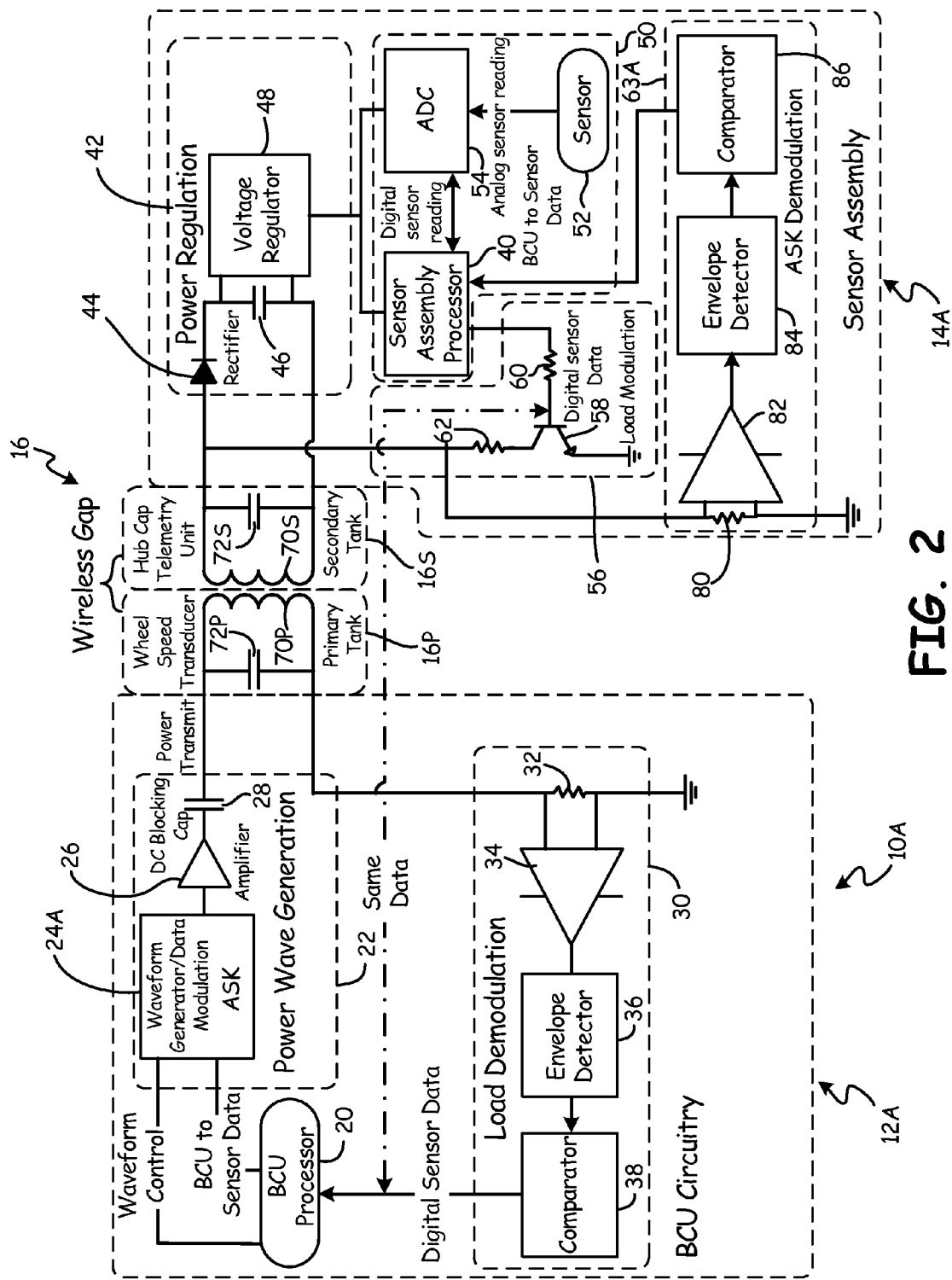
FIG. 2 is a block diagram of a tire monitoring system including a control unit, a sensor assembly, and a wireless link in which both power and control unit data are sent to the sensor assembly using amplitude shift key (ASK) modulation of the power signal.

In the embodiment shown in FIG. 1, BCU-to-sensor data is transmitted together with the power signal by FSK modulation. FIG. 2 shows another embodiment, in which amplitude shift key (ASK) modulation is used rather than FSK modulation. System 10A of FIG. 2 is generally similar to system 10 of FIG. 1, and similar components have been identified with the same reference numerals used in FIG. 1. In particular, BCU circuitry 12A is similar to the circuitry in BCU circuitry 12 of FIG. 1, except for waveform generator/data modulation circuit 24A, which performs amplitude shift key (ASK) modulation rather than frequency shift key (FSK) modulation. Sensor assembly 14A is similar to sensor assembly 14 of FIG. 1, except that demodulation circuitry 63A performs ASK demodulation, rather than FSK demodulation. The components of ASK demodulation circuit 63A include sense resistor 80, operational amplifier 82, envelope detector 84, and comparator 86. The output of comparator 86 is BCU-to-sensor data that is supplied to sensor assembly processor 40.

The demodulation of an ASK encoded power signal from BCU circuitry 12A to sensor assembly 14A involves a process that is very similar to how demodulation circuitry 30 demodulates digital sensor data from sensor assembly 14A. In system 10A, BCU circuitry 12A manipulates the voltage amplitude that is transmitted into the rotary transformer.

To perform amplitude shift key modulation, waveform generator/data modulation circuit 24A modulates the voltage signal between two voltage levels, both of which are higher than the minimum voltage needed in the signal to provide adequate power to regulation circuit 42 of sensor assembly 14A. With amplitude shift key modulation, the frequency of the combined power and BCU-to-sensor data signal continuously operates at the carrier frequency, which is optimal for that application through rotary transformer 16.

Discussion of Possible Embodiments

The following are non-exclusive descriptions of possible embodiments of the present invention.

A system comprises a control unit, a sensor assembly, and a rotary transformer. The control unit produces a power signal at a carrier frequency and modulates the power signal to provide control unit data carried by the power signal. The sensor assembly, which is powered by the power signal, senses a parameter associated with a condition of a wheel, demodulates the power signal to derive the control unit data, and modulates the power signal to provide sensor data representative of the sensed parameter to the control unit. The rotary transformer connected to the control unit and to the sensor assembly for wirelessly transmitting the power signal and control unit data from the control unit to the sensor assembly and wirelessly transmitting the sensor data from the sensor assembly to the control unit.

The system of the preceding paragraph can optionally include, additionally and/or alternatively, any one or more of the following features, configurations and/or additional component.

The rotary transformer includes a primary tank circuit and a secondary tank circuit.

The control unit includes a control digital processor and a power wave generation circuit that produces the power signal and modulates the power signal based on the control unit data.

The sensor assembly includes: a sensor for sensing the parameter; a sensor assembly digital processor for producing sensor data representative of the parameter sensed by the sensor; a demodulation circuit electrically connected to the secondary tank circuit for demodulating the power signal to provide the control unit data to the sensor assembly digital processor; a power regulation circuit connected to the secondary tank circuit to provide electric power for the sensor assembly derived from the power signal; and a load modulation circuit connected to the secondary tank circuit to produce a load modulation signal based on the sensor data.

The power wave generation circuit modulates the power signal by frequency shift key (FSK) modulation, and the demodulation circuit is a FSK demodulation circuit.

The power wave generation circuit is configured to modulate the power signal between at least two frequencies. The two frequencies vary from the carrier frequency by an amount that is both greater than an amount necessary for the demodulation circuit to resolve the control unit data from the modulated power signal, and less than an amount allowed to maintain a power transmission efficiency of the power signal through the rotary transformer to the power regulation circuit sufficient to provide the electric power required by the sensor assembly.

The power wave generation circuit modulates the power signal by amplitude shift key (ASK) modulation, and the demodulation circuit is an ASK demodulation circuit.

The power wave generation circuit is configured to modulate the power signal between at least two voltages. The two voltages vary from each other by an amount that is greater than an amount necessary for the demodulation circuit to resolve the control unit data from the power signal, and the two voltages are greater than a minimum voltage required by the power regulation circuit to provide the electric power required by the sensor assembly.

The control unit further includes a load demodulation circuit electrically connected to the primary tank circuit for demodulating the sensor data from the load modulation signal and providing the sensor data to the control unit digital processor.

The sensor is a pressure sensor.

The pressure sensor is an aircraft tire pressure sensor.

The method of the preceding paragraph can optionally include, additionally and/or alternatively, any one or more of the following features, configurations and/or additional components.

A method simultaneously provides both power and control unit data from a control unit to a sensor assembly. The method comprises: generating a control unit data; generating a power signal having a carrier frequency; modulating the power signal according to the control unit data to encode the control unit data in the waveform; transmitting the power signal across a rotary transformer; receiving the power signal at the sensor assembly from the rotary transformer; deriving electric power for the sensor assembly from the power signal; and demodulating the power signal to derive the control unit data at the sensor assembly.

The system of the preceding paragraph can optionally include, additionally and/or alternatively, any one or more of the following features, configurations and/or additional component.

Modulating the power signal comprises frequency shift key (FSK) modulation, and demodulating the power signal comprises FSK demodulation.

Modulating the power signal comprises amplitude shift key (ASK) modulation and demodulation the power signal comprises ASK demodulation.

The method further comprises: sensing a parameter; producing sensor data representative of the parameter sensed; load modulating the power signal based on the sensor data at the sensor assembly; and load demodulating the power signal at the control unit to derive the sensor data.

While the invention has been described with reference to an exemplary embodiment(s), it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment(s) disclosed, but that the invention will include all embodiments falling within the scope of the appended claims.

The invention claimed is:

1. A system comprising:
   a control unit that produces a power signal at a carrier frequency and shift key modulates the power signal to provide control unit data carried by the power signal;
   a sensor assembly, powered by the power signal, that senses a parameter associated with a condition of a wheel, demodulates the power signal to derive the control unit data, and modulates the power signal to provide sensor data representative of the sensed parameter to the control unit; and
   a rotary transformer that includes a primary tuned L-C resonant tank circuit connected to the control unit and a secondary tuned L-C resonant tank circuit connected to the sensor assembly for inductively transmitting the power signal and control unit data from the control unit to the sensor assembly by shift key modulation and inductively transmitting the sensor data from the sensor assembly to the control unit by load modulation, wherein the primary tuned L-C resonant tank circuit and the secondary tuned L-C resonant tank circuit are independently tuned;
   wherein a power wave generation circuit modulates the power signal by frequency shift key (FSK) modulation, and the demodulation circuit is a FSK demodulation circuit; and
   wherein the power wave generation circuit is configured to modulate the power signal between at least two frequencies, wherein the two frequencies vary from the carrier frequency by an amount that is both greater than an amount necessary for the demodulation circuit to resolve the control unit data from the modulated power signal, and less than an amount needed to maintain a power transmission efficiency of the power signal through the rotary transformer to a power regulation circuit sufficient to provide the electric power required by the sensor assembly.

2. The system of claim 1, wherein:
   the control unit includes:
      a control digital processor;
      the power wave generation circuit controlled by the control unit digital processor that produces the power signal and modulates the power signal based on the control unit data; and
   the sensor assembly includes:
      a sensor for sensing the parameter;
      a sensor assembly digital processor for producing sensor data representative of the parameter sensed by the sensor;
      the power regulation circuit connected to the secondary tank circuit to provide electric power for the sensor assembly derived from the power signal;
      a demodulation circuit electrically connected to the secondary tank circuit for demodulating the power signal to provide the control unit data to the sensor assembly digital processor; and
      a load modulation circuit connected to the secondary tank circuit to produce a load modulation signal based on the sensor data.

3. The system of claim 2, wherein the control unit further includes a load demodulation circuit electrically connected to the primary tank circuit for demodulating the sensor data from the load modulation signal and providing the sensor data to the control unit digital processor.

4. The system of claim 3, wherein the pressure sensor is an aircraft tire pressure sensor.

5. The system of claim 2, wherein the sensor is a pressure sensor.

6. A method of simultaneously providing both power and control unit data from a control unit to a sensor assembly, the method comprising:
   generating control unit data;
   generating a power signal having a carrier frequency;
   shift key modulating the power signal according to the control unit data to encode the control unit data in the waveform;
   inductively transmitting the power signal across a rotary transformer that includes a primary tuned L-C resonant tank circuit connected to the control unit and a secondary tuned L-C resonant tank circuit connected to the sensor assembly, wherein the primary tuned L-C resonant tank circuit and the secondary tuned L-C resonant tank circuit are independently tuned;
   inductively receiving the power signal at the sensor assembly from the rotary transformer;
   deriving electric power for the sensor assembly from the power signal;
   demodulating the power signal to derive the control unit data at the sensor assembly;
   sensing a parameter;
   producing sensor data representative of the parameter sensed;
   load modulating the power signal based on the sensor data at the sensor assembly, the load modulating comprising changing a load on the secondary tank circuit based on the sensor data to cause a load modulation signal to be inductively transmitted from the secondary tank circuit to the primary tank circuit; and
   load demodulating the load modulation signal received by the primary tank circuit at the control unit to derive the sensor data;
   wherein a power wave generation circuit modulates the power signal by frequency shift key (FSK) modulation, and the demodulation circuit is a FSK demodulation circuit; and
   wherein the power wave generation circuit is configured to modulate the power signal between at least two frequencies, wherein the two frequencies vary from the carrier frequency by an amount that is both greater than an amount necessary for the demodulation circuit to resolve the control unit data from the modulated power signal, and less than an amount needed to maintain a power transmission efficiency of the power signal through the rotary transformer to a power regulation circuit sufficient to provide the electric power required by the sensor assembly.

7. A system comprising:
   a control unit that produces a power signal at a carrier frequency and modulates the power signal to provide control unit data carried by the power signal;
   a sensor assembly, powered by the power signal, that senses a parameter associated with a condition of a wheel, demodulates the power signal to derive the control unit data, and modulates the power signal to provide sensor data representative of the sensed parameter to the control unit; and
   a rotary transformer connected to the control unit and to the sensor assembly for wirelessly transmitting the power signal and control unit data from the control unit to the sensor assembly and wirelessly transmitting the sensor data from the sensor assembly to the control unit;
   wherein the rotary transformer includes a primary tank circuit and a secondary tank circuit;
   wherein the control unit includes:
      a control digital processor;
      a power wave generation circuit controlled by the control unit digital processor that produces the power signal and modulates the power signal based on the control unit data;
   wherein the sensor assembly includes:
      a sensor for sensing the parameter;
      a sensor assembly digital processor for producing sensor data representative of the parameter sensed by the sensor;
      a power regulation circuit connected to the secondary tank circuit to provide electric power for the sensor assembly derived from the power signal;
      a demodulation circuit electrically connected to the secondary tank circuit for demodulating the power signal to provide the control unit data to the sensor assembly digital processor; and
      a load modulation circuit connected to the secondary tank circuit to produce a load modulation signal based on the sensor data;
   wherein the power wave generation circuit modulates the power signal by frequency shift key (FSK) modulation, and the demodulation circuit is a FSK demodulation circuit; and
   wherein the power wave generation circuit is configured to modulate the power signal between at least two frequencies, wherein the two frequencies vary from the carrier frequency by an amount that is both greater than an amount necessary for the demodulation circuit to resolve the control unit data from the modulated power signal, and less than an amount needed to maintain a power transmission efficiency of the power signal through the rotary transformer to the power regulation circuit sufficient to provide the electric power required by the sensor assembly.

8. The system of claim 7, wherein the control unit further includes a load demodulation circuit electrically connected to the primary tank circuit for demodulating the sensor data from the load modulation signal and providing the sensor data to the control unit digital processor.

9. The system of claim 7, wherein the sensor is a pressure sensor.

10. The system of claim 9, wherein the pressure sensor is an aircraft tire pressure sensor.

* * * * *